United States Patent [19]

Rosenbaum

[11] 4,040,390
[45] Aug. 9, 1977

[54] ANIMAL GROOMING TOOL
[76] Inventor: James E. Rosenbaum, Box 400, Keller, Tex. 76248
[21] Appl. No.: 648,245
[22] Filed: Jan. 12, 1976
[51] Int. Cl.² ............................................. A01K 13/00
[52] U.S. Cl. .................................... 119/86; 15/236 R; 17/66
[58] Field of Search .................................. 119/83–94; 17/64, 66, 68, 69, 67; 15/110, 111, 236

[56] References Cited
U.S. PATENT DOCUMENTS

| 1,280,911 | 10/1918 | Walsh | 17/69 |
| 2,516,414 | 7/1950 | Pilliod | 119/92 |
| 3,151,346 | 10/1964 | Gray | 119/93 |

FOREIGN PATENT DOCUMENTS

| 52,796 | 6/1937 | Denmark | 119/86 |
| 2,346,259 | 3/1975 | Germany | 17/66 |
| 1,047,520 | 4/1958 | Germany | 119/92 |
| 285,401 | 9/1952 | Switzerland | 119/92 |
| 533,886 | 2/1956 | Switzerland | 119/86 |

Primary Examiner—Russell R. Kinsey
Assistant Examiner—Peter K. Skiff
Attorney, Agent, or Firm—Drummond, Nelson & Ptak

[57] ABSTRACT

A multi-purpose grooming and shedding tool suitable for removing dirt and shedding hair and simultaneously grooming animals, such as horses, is made in the form of an oval-shaped, molded plastic body member having depending grooming teeth formed in a portion of the outer periphery of the tool. A second row of grooming teeth extend downwardly from the body portion and are spaced inwardly from the outer periphery. A separate shedding blade is attached to another portion of the outer periphery of the tool and has more closely spaced teeth in it than the grooming teeth molded into the main body portion of the tool.

9 Claims, 5 Drawing Figures

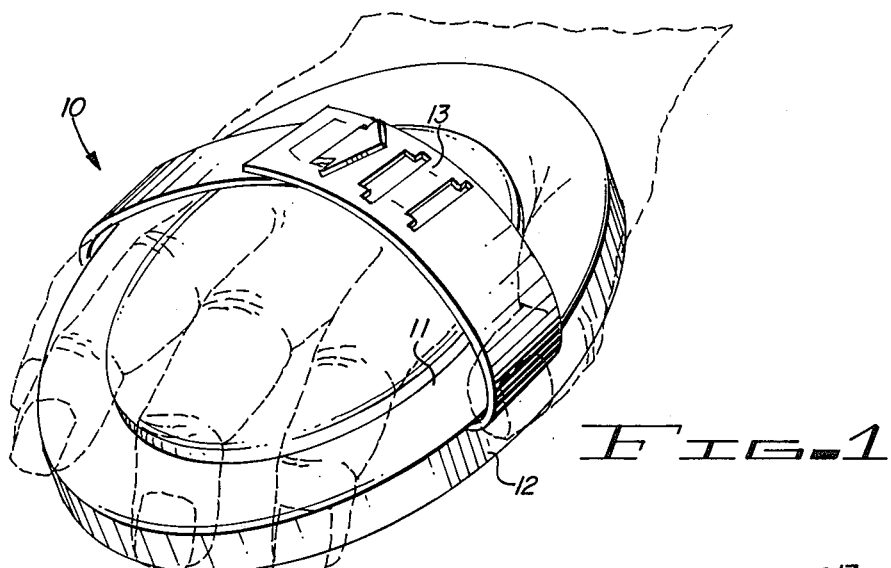
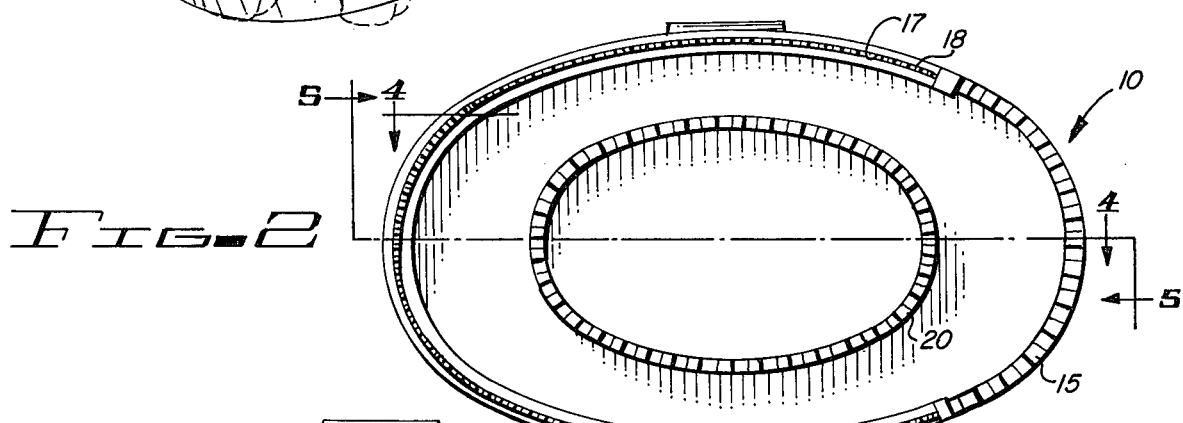
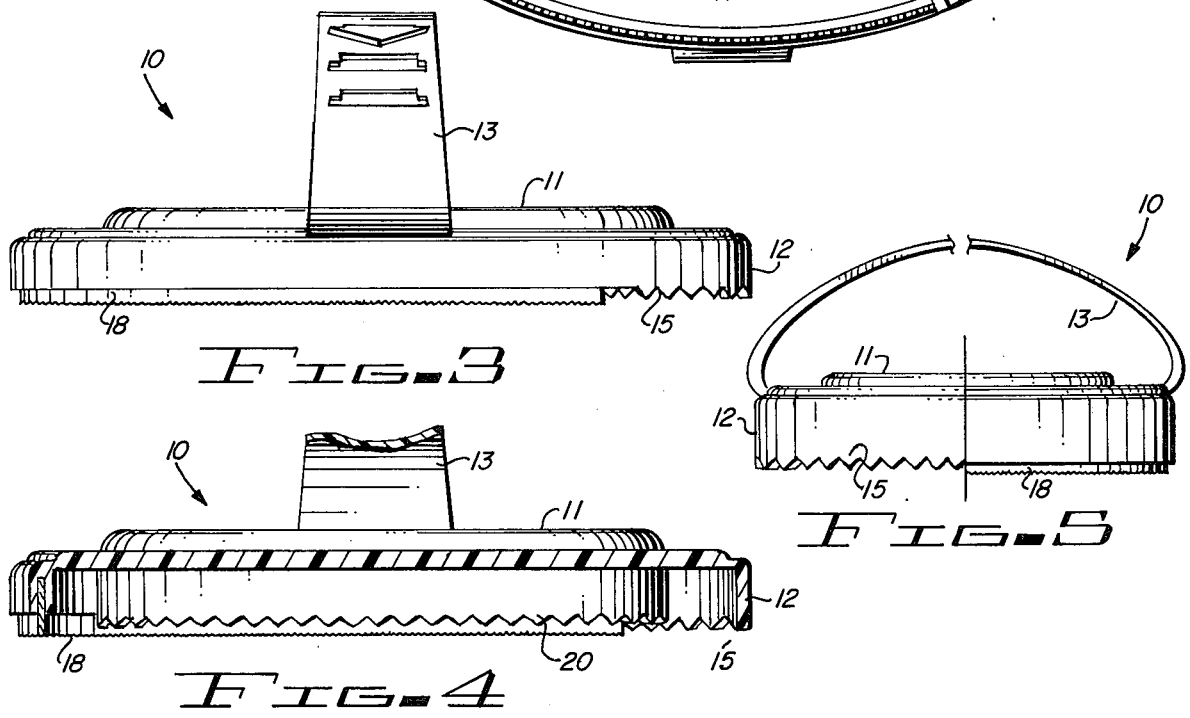

ANIMAL GROOMING TOOL

BACKGROUND OF THE INVENTION

Horse owners are continually faced with the problem of removing caked-on mud and dirt from the horse, removing shedding hair, and grooming the horse for show and an attractive appearance. A number of different tools are available for doing these different jobs, and a thorough grooming job generally requires the alternate use of several such tools.

Shedding bars having a straight steel blade with closely spaced teeth are available for removing embedded dirt and mud and for removing shedding hair. Such shedding bars, however, because of the elongated shape of the blade, are inconvenient for use on the legs of the horse or in the cup-shaped regions of the horse's body. Curved shedding blades also are available which may be held in one hand, or which may be extended for two-handed operation, but such blades are difficult to use. In addition, unless such shedding bars or shedding blades are very carefully used, the skin of the horse may be easily cut or irritated.

Then, following use of a shedding bar or blade, a separate grooming tool in the form of a rubber or plastic currycomb or the like is needed to complete the grooming job. Thus, in the past, it has been necessary first to use either a shedding bar or shedding blade to remove the dirt and shedding hair from the horse and then to employ a separate metal or plastic currycomb to complete the grooming.

It is desirable to employ a single tool to handle the grooming and shedding jobs for a horse to replace the conventional currycombs, shedding bars and hard-to-handle shedding blades. It is further desirable to eliminate the necessity for changing from one tool to another when grooming and shedding a horse, and to have such a tool made in a manner which minimizes skin irritation of the horse.

SUMMARY OF THE INVENTION

It is an object of this invention to provide an improved grooming tool for animals.

It is another object of this invention to provide an improved multi-purpose grooming tool for animals.

It is an additional object of this invention to provide an improved combination cleaning, shedding and grooming tool for horses and the like.

It is yet another object of this invention to provide a single multi-purpose grooming tool for horses which is useful for removal of shedding hair, mud and dirt, while simultaneously grooming the horse.

It is a further object of this invention to provide a horse grooming tool which is lightweight and easy to use.

It is still another object of this invention to provide a horse grooming tool which is relatively simple to manufacture and durable in use.

It is a still further object of this invention to provide a horse grooming tool which minimizes skin irritation to the horse.

In accordance with a preferred embodiment of this invention, a combination grooming and shedding tool for animals, such as horses, comprises a body member molded of plastic material and having a generally cup-shaped configuration, with integrally formed depending grooming teeth of a first predetermined size formed on a portion of the periphery thereof. A shedding blade having teeth of a second predetermined size is attached to at least another portion of the periphery of the body member.

More specific embodiments of the invention include a second row of depending grooming teeth extending downwardly from the lower surface of the main body member and spaced inwardly from the sets of teeth formed on the outer periphery of the tool. In addition, the body member and at least the sets of grooming teeth all may be molded of a unitary piece of plastic material. A strap also may be formed as an integral part of the tool for extending over the hand of the user to hold the tool in place on the hand when the tool is being used.

BRIEF DESCRIPTION OF THE DRAWING

FIG. 1 is a perspective view of the upper portion of the tool showing it in position on the hand of the user;

FIG. 2 is a bottom view of the tool shown in FIG. 1;

FIG. 3 is a side view of the tool shown in FIGS. 1 and 2;

FIG. 4 is a sectional view taken along the lines 4—4 of FIG. 2; and

FIG. 5 is an offset secton of the ends of the device of FIG. 2.

DETAILED DESCRIPTION

Referring now to the drawings, the same reference numbers are used throughout the several views to designate the same or similar components.

FIG. 1 shows a combination or multi-purpose grooming tool 10 which is ideally suited for grooming horses and removing dirt and shedding hair. The tool comprises a generally oval-shaped body portion 11 having a depending outer periphery 12 extending around the body portion 11 to form a substantially cup-shaped tool, the upper surface of which is generally in the size of the shape of a person's hand, with the fingers extended. Preferably, the body portion 11 and the sides 12 are integrally formed of a single piece of molded plastic, such as polypropelyne or poly-ethylene plastic.

In order to assist the user in holding the tool 10 in place when it is being used to groom a horse, a two-piece adjustable strap 13 is integrally formed or molded along with the remainder of the body portion. The strap 13 includes male and female adjustable fastener portions to suit the strap to different sized hands with which the tool 10 may be used. As shown in FIG. 1, the strap 13 is in its closed posiiton over the hand of the user. The strap 13 may be adjusted to fit the tool 10 tightly over the hand. This prevents the tool from being dislodged and also substantially reduces the strain to which the fingers of the user are subjected when the tool is used.

The oval or curved shape of the tool, seen most clearly in FIG. 2, of the size generally indicated in FIG. 1 to be comparable to the size of the hand of the person using the tool, permits fitting the contours of the horse's body in all areas, from the relatively large flat areas of the flank to the sharply curved areas of the legs. In addition, the tool, because of its oval ends, is easily used in curved and cupped places on the horse's body; so that essentially all areas of the horse may be groomed with this single tool. By placing the tool on the palm of the hand of the user, as shown in FIG. 1, a natural scrubbing or cleaning motion by the user may be employed without strain.

As shown most clearly in FIG. 2, a portion of the depending outer periphery 12 of the tool has grooming teeth 15 integrally formed in it. These teeth are of relatively large size, typically being approximately one-fourth inch from point to point, and having a depth of approximately one-eighth inch. The remainder of the outer depending periphery 12 of the tool 10 has a groove 17 formed in it, and a metal shedding blade 18 is press-fit into the groove 17. The shedding blade 18 may be a conventional hacksaw blade or the like and typically has relatively fine teeth ranging from 18 teeth per inch to 32 teeth per inch. An 18-toothed blade 18 typically would be employed for heavy shedding horses, whereas a 32-toothed blade would be used for light-skinned and light-haired horses. Generally, a 24-toothed blade 18 is employed.

In addition to the teeth 15 and 18 on the outer periphery of the tool, a second set of grooming teeth 20 are formed in a downwardly depending concentric oval, spaced inwardly from the outer periphery 12 which has teeth 15 and 18 in it. This second set of teeth 20 is integrally formed with the main body portion 11, depending side wall 12, and teeth 15; and the teeth 20 have the same dimensions as the grooming teeth 15.

When the tool is used, the relatively narrow ends of the oval permit it to be utilzied in hard-to-reach curved and cupped places on the horse's body. Used longitudinally of the oval, the tool also may conveniently be used to shed and groom the horse's legs, whereas the wide portions of the tool may be employed in lateral movement over the flank of the horse and its back and sides. Because of the shape of the tool 10 and the manner in which it fits the hand of the user, it may be used in a rotary motion, a stroking motion, or a back-and-forth rubbing motion as desired.

By embedding the shedding blade 18 in the groove 17 so that only about one-eighth inch of the blade 18 extends beyond the soft, rounded edge of the tool 10, and also by employing relatively blunt grooming teeth 15, the tool 10 substantially eliminates irritation of the horse's skin, even for horses having very sensitive skin. This is in direct contrast to conventional shedding tools, which, if they are not carefully used in a skillful manner, can irritate and cut the horse's skin, particularly in curved and cupped places.

The blade 18 conveniently and rapidly functions to clean out caked-on mud and dirt, even out of short hair. In addition, the blade 18 functions to remove shedding hair quickly and effectively. At the same time, the teeth 15 perform a grooming function; so that when the tool is stroked in the direction of the lay of the horse's hair, shedding, cleaning and grooming are simultaneously accomplished.

The length of the hair on which the tool is used is of no consequence, and it functions well for thinning manes and tails, as well as for removing dirt and shedding hair on short-haired horses.

The adjustable strap 13 provides a convenient and comfortable fit for the tool on the palm of the hand of the user, whether the hand is large or small.

In a commercial version of the tool, the long axis of the oval is approximately 6 and ½ inches in length and the short axis is approximately 4 and ½ inches across, and the inner oval of grooming teeth 20 are spaced approximately one inch from the outer periphery of the tool. The inner row of teeth 20 extend approximately ½ inch from the lower surface of the body member 11, and the teeth 15 and 18 extend approximately 9/16 inches from the lower surface of the main body portion 11 of the tool. Thus, the plane which the tips of the teeth 15 and 18 lie extends downwardly slightly farther than the plane in which the tips of the teeth 20 lie. This causes the tool to conform more nearly to the natural contours of the horse's body in curved areas, yet also permits its use effectively in relatively flat areas of the body.

The grooming tool shown in FIGS. 1–4 and described above combines the functions of a number of separate tools previously required to effect cleaning, shedding and grooming of horses. The tool substantially reduces the amount of time required for grooming, shedding and cleaning a horse over the time required previously, using several different tools.

I claim:

1. A multi-purpose grooming and shedding tool for animals including in combination:
   a body member made of plastic material and having a support surface and a curved depending portion extending downwardly around the periphery of the support surface, said portion having first and second parts located thereon;
   grooming teeth integrally formed with said body member of a first predetermined size on said first part of the curved depending portion of said body member;
   a curved shedding blade comprising a hacksaw blade having teeth of a second smaller predetermined size on said second part of the curved depending portion of said member; and
   an additional set of depending teeth attached to a further curved depending portion of said body member and space inwardly from the periphery thereof a predetermined distance.

2. The combination according to claim 1 wherein said shedding blade is removably attached to said second part of the depending portion of said body member.

3. The combination according to claim 1 wherein said body member is of an oval configuration adapted to fit beneath the hand of the user.

4. The combination according to claim 3 wherein said body member has strap thereon for holding said tool on the hand of a user.

5. The combination according to claim 1 wherein said plastic material is polypropelyne plastic.

6. The combination according to claim 1 wherein said additional set of depending teeth are grooming teeth having said first predetermined size.

7. The combination according to claim 6 wherein said second predetermined size of teeth of said shedding blade is substantially smaller than said first predetermined size of said grooming teeth.

8. The combination according to claim 7 wherein said body member, said grooming teeth and said additional set of grooming teeth are integrally molded of a unitary piece of plastic material of a size adapted to fit the hand of a user, and said hacksaw blade is a metal hacksaw blade attached to the second part of the depending periphery of said body member.

9. The combination according to claim 8 further including a strap extending across the surface of said body member opposite the surface having said depending teeth thereon for holding the tool on the hand of a user when the tool is in use.

* * * * *

UNITED STATES PATENT AND TRADEMARK OFFICE
CERTIFICATE OF CORRECTION

PATENT NO. : 4,040,390
DATED : August 9, 1977
INVENTOR(S) : James E. Rosenbaum

It is certified that error appears in the above-identified patent and that said Letters Patent are hereby corrected as shown below:

Column 4, line 33:
  "space" should be --spaced--;

Column 4, line 42:
  "has strap" should be --has a strap--;

Claim 8, line 5:
  first occurrence of "hacksaw blade" should be --shedding blade--.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks